US012810519B2

(12) United States Patent
Master Ben-Dor et al.

(10) Patent No.: US 12,810,519 B2
(45) Date of Patent: Nov. 24, 2026

(54) DYNAMIC VIDEO ENHANCEMENT SYSTEM WITH HYPER-REALISTIC AVATARS

(71) Applicant: Microsoft Technology Licensing, LLC, Redmond, WA (US)

(72) Inventors: Karen Master Ben-Dor, Kfar Saba (IL); Raz Halaly, Ness Ziyona (IL); Adi Diamant, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 18/911,082

(22) Filed: Oct. 9, 2024

(65) Prior Publication Data

US 2026/0099976 A1 Apr. 9, 2026

(51) Int. Cl.

| | |
|---|---|
| ***G06T 13/40*** | (2011.01) |
| ***G06T 7/00*** | (2017.01) |
| ***G06T 7/11*** | (2017.01) |
| ***G06T 7/70*** | (2017.01) |
| ***G06T 13/20*** | (2011.01) |

(52) U.S. Cl.

CPC ............ *G06T 13/40* (2013.01); *G06T 7/0002* (2013.01); *G06T 7/11* (2017.01); *G06T 7/70* (2017.01); *G06T 13/205* (2013.01); *G06T 2200/24* (2013.01); *G06T 2207/10016* (2013.01); *G06T 2207/30168* (2013.01); *G06T 2207/30201* (2013.01)

(58) Field of Classification Search

CPC ......... G06T 13/40; G06T 7/0002; G06T 7/11; G06T 7/70; G06T 13/205; G06T 2200/24; G06T 2207/10016; G06T 2207/30168; G06T 2207/30201

See application file for complete search history.

(56) References Cited

U.S. PATENT DOCUMENTS 10,904,488 B1 * 1/2021 Weisz .................. G06V 10/774
11,165,992 B1 * 11/2021 Ong ....................... G06V 10/82

(Continued)

OTHER PUBLICATIONS

"Further input about 2D Avatar", 3GPP TSG-SA WG4 Meeting 127-bis-e, Apr. 8, 2024, 8 Pages.

(Continued)

*Primary Examiner* — Said Broome
*Assistant Examiner* — Andrew Shin
(74) *Attorney, Agent, or Firm* — Schwegman Lundberg & Woessner, P.A.

(57) ABSTRACT

A technique for enhancing video representation in network-based meetings dynamically replaces low-quality video feeds with animated avatars. The system evaluates individual video feeds against quality thresholds related to head pose, facial feature visibility, and image clarity. When a feed fails to meet these thresholds, an animation of the participant is generated using a previously captured image. Speech context analysis enables the application of realistic facial expressions and lip movements to the animation. The animated avatar, synchronized with the speech of the participant, is then displayed in place of the original video feed, within the user interface of the network-based meeting. This approach maintains visual engagement for remote participants, even when in-room attendees are partially occluded, poorly captured by the camera, or have suboptimal head poses.

20 Claims, 8 Drawing Sheets

(56) References Cited

U.S. PATENT DOCUMENTS

| | | | | |
|---|---|---|---|---|
| 2012/0280974 | A1 | 11/2012 | Wang | |
| 2016/0134840 | A1* | 5/2016 | McCulloch | G06V 40/165<br>348/14.03 |
| 2017/0332044 | A1* | 11/2017 | Marlow | G06V 20/46 |
| 2021/0360199 | A1 | 11/2021 | Oz | |
| 2022/0012913 | A1* | 1/2022 | Thomas | G06T 7/75 |
| 2022/0191429 | A1 | 6/2022 | Astarabadi | |
| 2023/0306740 | A1* | 9/2023 | Rizk | G06V 10/82 |
| 2024/0062467 | A1* | 2/2024 | Sarkis | G06V 10/82 |

OTHER PUBLICATIONS

International Search Report and Written Opinion received for PCT Application No. PCT/US2025/038990, mailed on Nov. 3, 2025, 15 pages.
"Cloud IntelliFrame", accessed on link https://learn.microsoft.com/en-us/microsoftteams/devices/cloud-intelliframe, Nov. 22, 2023, 5 pages.

* cited by examiner

DYNAMIC VIDEO ENHANCEMENT SYSTEM WITH HYPER-REALISTIC AVATARS

TECHNICAL FIELD

The present application pertains to the technical field of video processing for online or network-based meetings, specifically focusing on enhancing the visual representation of participants. The application describes techniques for dynamically evaluating video quality of meeting attendees, particularly in-room meeting attendees, and generating photorealistic avatars to replace poor quality video feeds. These techniques enable meeting systems to maintain high-quality visual engagement between in-room and remote participants by intelligently substituting live video with animated avatars when necessary.

BACKGROUND

Online or network-based meetings have become an integral part of modern business communication, enabling collaboration between geographically dispersed participants. These meetings often involve a combination of in-room attendees gathered in a physical conference room and remote participants joining via meeting service or video conferencing software. Video conferencing systems typically capture and transmit a live video feed of in-room participants to remote attendees. These systems typically employ a single front-of-room camera.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
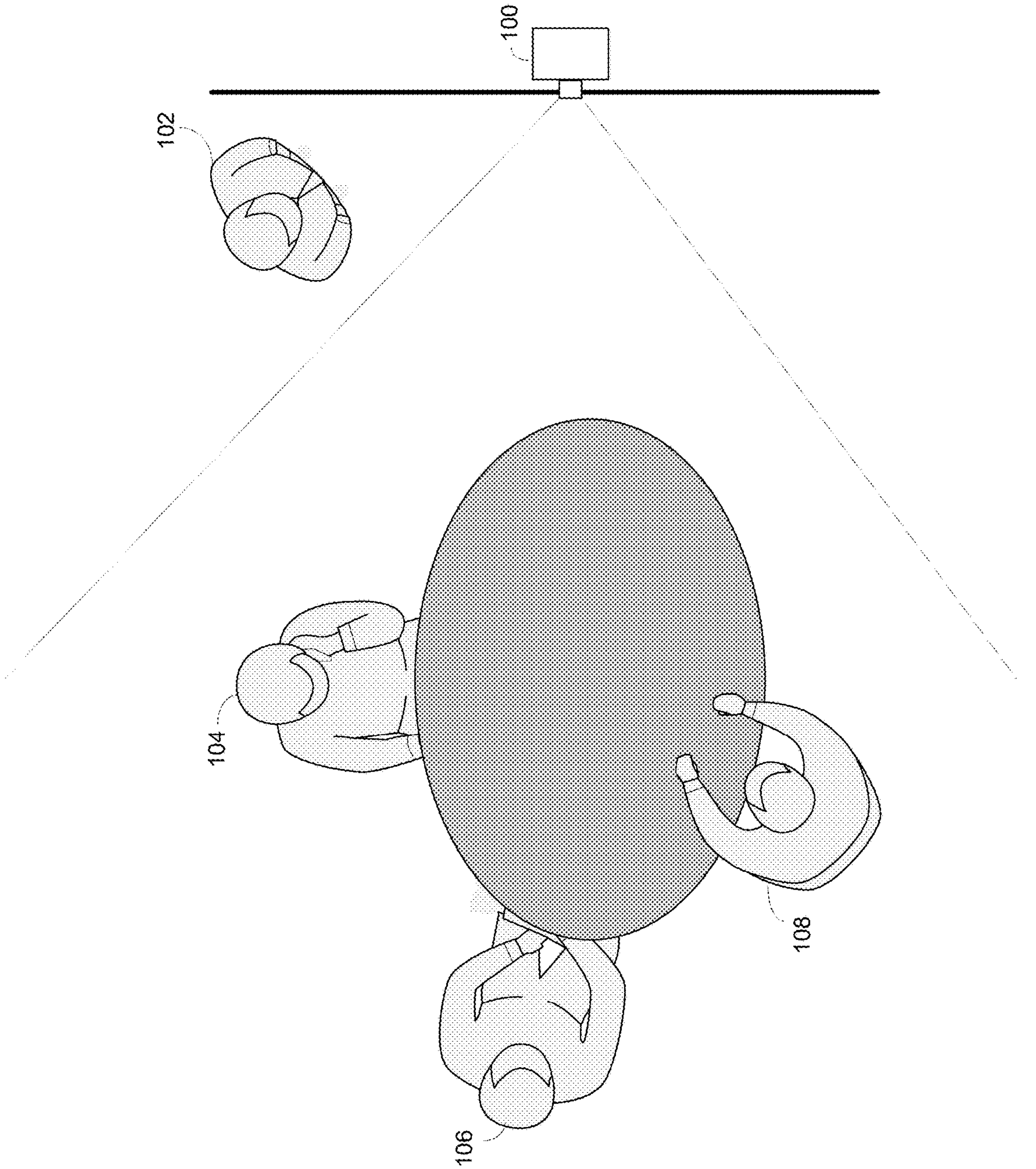
FIG. 1 illustrates a diagram of a meeting room setup with multiple participants and a camera, consistent with some embodiments.

Described herein are techniques for enhancing video quality and participant representation in network-based meetings, specifically focusing on dynamic video processing and avatar generation to improve visual engagement. The present disclosure outlines methods implemented by a meeting system and service to evaluate the quality of in-room participant video feeds in real-time and seamlessly substitute poor quality feeds with photorealistic animated avatars. These techniques enable the meeting system to maintain high-quality visual representation of all participants, even when faced with challenges such as partial occlusion, poor camera angles, or inadequate lighting conditions. The meeting system performs operations including capturing live video, segmenting individual participants, assessing video quality against predefined thresholds, generating and animating photorealistic avatars, and dynamically switching between live video and avatar representations. By automating the process of video quality enhancement and providing consistent, engaging visual representations of all participants, the described techniques significantly improve the efficacy of hybrid meetings. The video processing and avatar generation operations detailed herein are particularly advantageous for digital communication platforms where clear visual engagement between in-room and remote participants is crucial for effective collaboration. In the following description, for purposes of explanation, numerous specific details of the meeting system's functionality are set forth to provide a thorough understanding of the embodiments of the present invention.

Conventional in-room meeting systems face several technical challenges when attempting to provide high-quality visual representation of all meeting participants, particularly in hybrid meetings. A hybrid meeting refers to a collaborative session where some participants are physically present in a conference room (in-room attendees) while others join remotely through video conferencing software (remote attendees). These challenges significantly impact the engagement and effectiveness of communication between in-room and remote attendees, as the system must seamlessly integrate and represent both groups of participants.

One of the primary issues is the limitation of camera placement and coverage in conference rooms. Typically, a single front-of-room camera is used to capture the entire meeting space. This setup often results in poor angles and partial occlusion of some in-room meeting participants, particularly those seated at the sides of long tables or furthest from the camera. As a result, remote attendees may struggle to see the faces and expressions of certain in-room meeting participants clearly, hindering their ability to fully engage in the meeting.

Another significant problem arises from the varying distances between participants and the camera. Attendees seated far from the camera appear small in the video feed, making it difficult for remote participants to discern their facial expressions and non-verbal cues. This issue is exacerbated in larger conference rooms or when the camera resolution is insufficient to capture fine details at a distance.

Lighting conditions in conference rooms present an additional challenge. Uneven lighting, backlighting from windows, or poor overall illumination can result in suboptimal video quality for some or all in-room participants. This can lead to underexposed or overexposed areas in the video feed, further reducing the clarity and visibility of participants' faces and expressions.

The dynamic nature of in-room interactions also poses difficulties for conventional systems. Participants may frequently change their positions, turn to face each other during discussions, or inadvertently block the camera's view of others. These movements can result in constantly changing video quality for individual participants, making it challenging for remote attendees in particular to maintain consistent visual engagement throughout the meeting.

Furthermore, the limitations of network bandwidth and processing power in conventional systems often necessitate compromises in video quality. This can lead to reduced frame rates, lower resolution, or increased compression artifacts, all of which detract from the clarity and smoothness of the video representation of in-room participants.

Lastly, the inability of traditional systems to adapt in real-time to changing conditions in the meeting room presents a significant hurdle. When video quality degrades for certain participants due to any of the aforementioned factors, conventional systems lack the capability to dynamically compensate or provide alternative visual representations to maintain engagement.

These technical challenges collectively contribute to a suboptimal experience for remote participants in hybrid meetings, potentially leading to reduced engagement, misunderstandings, and less effective communication between in-room and remote attendees.

Consistent with some embodiments of the present invention, an improved meeting system and service address the technical challenges faced by conventional in-room meeting systems by introducing an innovative approach to video processing and participant representation in hybrid meetings. In certain implementations, the system employs advanced real-time video analysis techniques to continuously evaluate the quality of in-room participant video feeds. This evaluation process considers factors such as facial visibility, head pose, occlusion, and overall image quality to determine whether each participant's video meets a predefined "ideal profile" threshold.

When the system detects that a participant's video feed does not meet the quality threshold, some embodiments dynamically generate a photorealistic animated avatar to replace the live video. This avatar generation process leverages pre-enrolled frontal images of participants, which are captured during a one-time enrollment procedure. The system then applies animation techniques to these avatars, synchronizing lip movements and facial expressions with the participant's speech and emotional context in real-time.

In some implementations, the avatar generation process goes beyond simple facial animation. The system may adapt the avatar's appearance to reflect the participant's current attire, hairstyle, and even accessories, enhancing the sense of presence and continuity for remote attendees. This adaptation process utilizes computer vision algorithms to analyze the available video feed, even if partially occluded, to extract relevant visual cues.

Certain embodiments of the invention incorporate a seamless transition mechanism between live video and avatar representations. The system continuously monitors the quality of the live video feed and automatically reverts to displaying the actual video when it satisfies the ideal profile threshold. This dynamic switching is designed to minimize disruption and maintain a natural flow of visual information for remote participants.

Some implementations of the system integrate advanced face detection, recognition, and tracking algorithms to manage multiple in-room participants simultaneously. This allows the system to handle complex scenarios where participants may be partially occluded by others or moving within the meeting space.

By addressing these technical challenges, embodiments of the invention aim to provide a more engaging and effective hybrid meeting experience, ensuring that remote participants can maintain clear visual contact with all in-room attendees, regardless of the physical limitations of the meeting space or camera setup.

FIG. 1 illustrates a top-down view of a meeting room setup that exemplifies the challenges addressed by the present invention. The figure depicts a single wide-angle camera 100 positioned at one end of the room, capturing a live feed of the ongoing meeting. This camera arrangement is designed to provide a comprehensive view of the entire meeting space, including multiple participants 104, 106, and 108 seated around an oval table and one meeting participant 102 who is standing out of the field of view of the camera 100.

The strategic placement of the single camera 100 allows for the capture of all meeting participants within its field of view. However, this configuration inherently leads to varying degrees of visual quality for each participant. As evident from the overhead perspective, participants 104, 106, and 108 are oriented at different angles relative to the camera 100. Participant 106, positioned at the far end of the table, faces the camera directly, potentially providing an optimal frontal view. In contrast, participants 104 and 108, seated along the sides of the table, are captured at oblique angles.

This arrangement highlights a key challenge in hybrid meetings: the difficulty in obtaining consistently high-quality video feeds of all in-room participants. The participants not directly facing the camera (104 and 108) may appear in the video feed with suboptimal head poses, partially occluded facial features, or reduced image clarity due to their orientation and distance from the camera. As a result, their representation in the meeting user interface is likely to be less than ideal, potentially hindering clear communication and engagement with remote participants. The illustration underscores the need for innovative solutions to enhance video representation in network-based meetings, particularly when dealing with the limitations of a single-camera setup in capturing multiple participants at various angles and distances.

Figure 2:
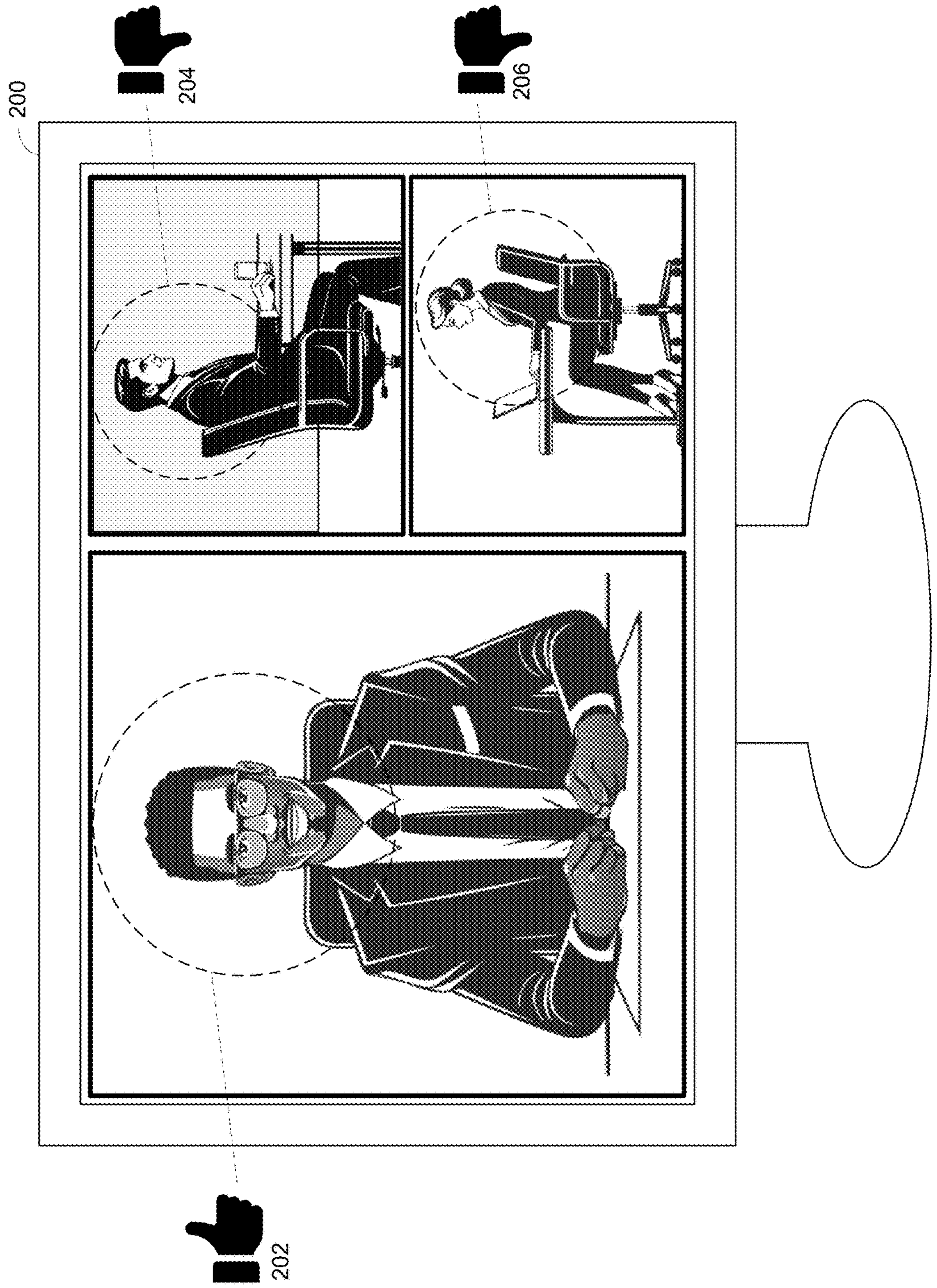
FIG. 2 depicts a user interface for a network-based meeting showing multiple participant video feeds, illustrating the problem of poor visibility and engagement due to suboptimal camera angles and participant positioning.

FIG. 2 illustrates a user interface 200 for a network-based meeting, demonstrating the challenges addressed by various embodiments of the present invention. In this scenario, a remote meeting participant is receiving live video feeds of meeting participants in a remote conference room through the meeting user interface. The video feed of the meeting participant with reference number 202 is of good or satisfactory quality. This participant is positioned such that they are essentially facing the camera, allowing the meeting service to generate an individual feed that meets a quality threshold. The frontal view provides clear visibility of facial features and expressions, enhancing engagement with remote participants.

In contrast, the video feeds of meeting participants with reference numbers 204 and 206 exhibit low quality. For participant 204, the side profile view results in partial occlusion of facial features, making it difficult for remote participants to fully engage or interpret non-verbal cues. Similarly, participant 206 is depicted at an angle that does not provide a clear frontal view, potentially due to their seating position relative to the camera. These low-quality video feeds fail to meet the ideal profile threshold for several reasons:

- Head pose: The participants' head angles exceed the predetermined threshold from a frontal view.
- Facial feature occlusion: Portions of the participants' facial features are obscured or missing in the individual video feeds due to their non-frontal positioning.

Image quality: The resolution or clarity of the images may be compromised due to the participants' distance from or angle to the camera, falling below the predetermined level for optimal representation.

Figure 3:
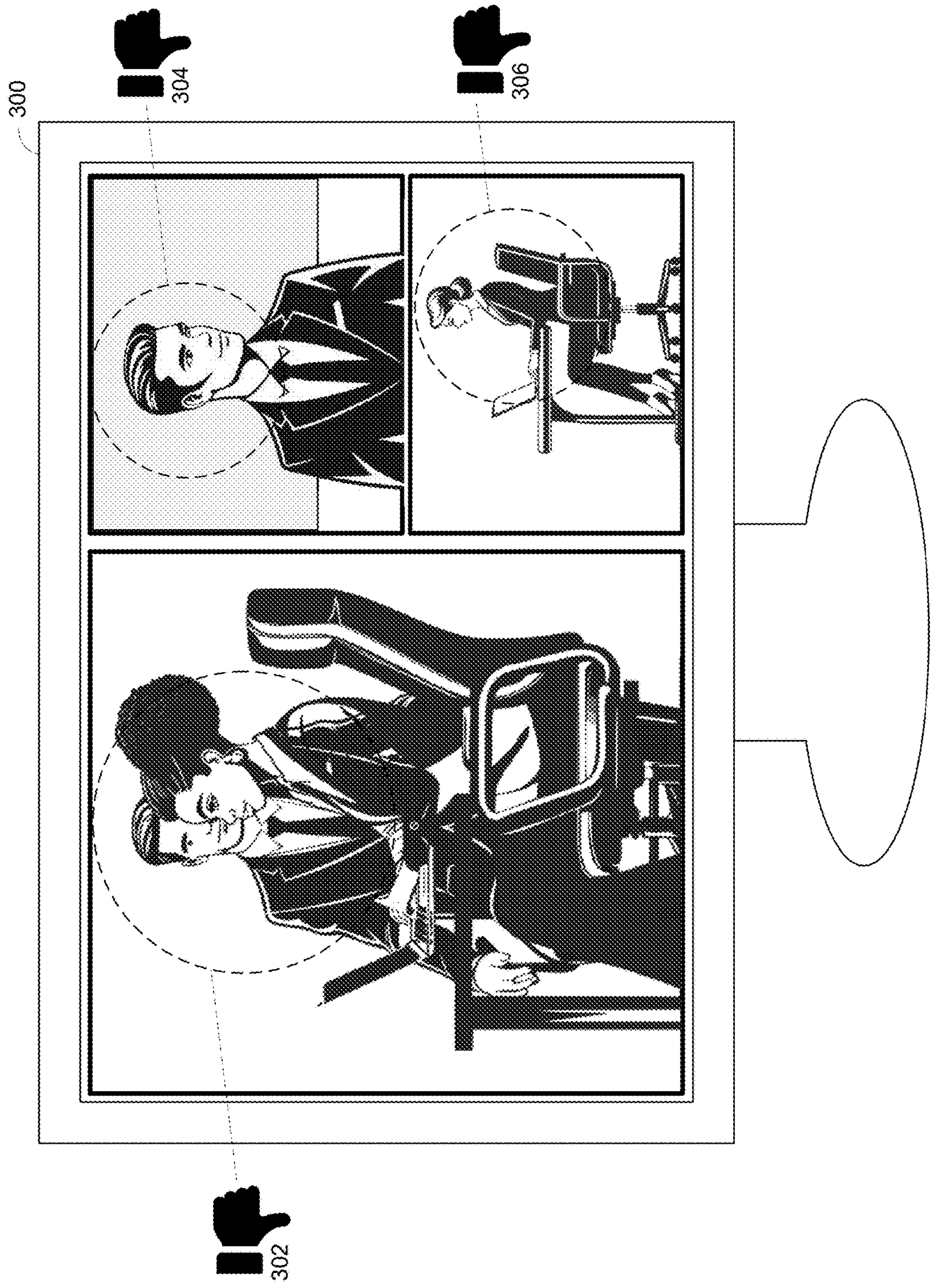
FIG. 3 illustrates another example of a user interface for a network-based meeting with multiple participant video feeds, further demonstrating the challenges of partially occluded faces and non-frontal views.

FIG. 3 illustrates another user interface 300 for a network-based meeting, further demonstrating the challenges addressed by the present invention. This figure depicts multiple participant video feeds, highlighting the issues of partially occluded faces and non-frontal views that can occur in hybrid meetings. The video feed in the main frame 302 shows two participants seated closely together, with one participant partially obscuring the other. This arrangement makes it difficult for remote attendees to clearly see the faces, and thus the facial expressions, of both participants, potentially hindering effective communication.

The upper right frame 304 displays a participant in profile view, demonstrating a head pose that exceeds the ideal threshold for frontal visibility. This non-optimal angle reduces the clarity of facial features and expressions, which are important for engagement in remote meetings. The lower right frame 306 shows a participant at an angle similar to that seen in FIG. 2, further emphasizing the persistent challenge of capturing clear, frontal views of all meeting participants with a single camera setup.

The suboptimal video feeds illustrated in FIG. 3 underscore the need for an improved approach that involves dynamically replacing low-quality video feeds with animated avatars to maintain visual engagement and communication effectiveness in network-based meetings. This figure effectively demonstrates the problem that the improved meeting system aims to solve: the inconsistent quality of video feeds in hybrid meetings, which can hinder clear communication and engagement between in-room and remote participants. By showcasing issues such as partially occluded faces, non-frontal views, and suboptimal camera angles, FIG. 3 highlights the challenges that necessitate the innovative solution proposed by this invention.

In addition to the scenarios already illustrated and described, occlusion of a meeting participant can occur due to various dynamic factors in the meeting environment. For instance, participants may inadvertently obstruct each other as they move around the room, such as when someone stands up to retrieve an item or walks in front of the camera to access a whiteboard or presentation screen. Gesticulation during animated discussions can also lead to temporary occlusions, with participants' hands or arms briefly blocking the view of their faces or those of others nearby.

Furthermore, the use of mobile devices or laptops during the meeting can create additional occlusion challenges. Participants may hold up tablets or phones to share information, inadvertently blocking their faces or those of their colleagues. Similarly, the opening and closing of laptop lids can momentarily obstruct the camera's view of certain participants.

Environmental factors can also contribute to occlusion issues. For example, changes in lighting conditions, such as sunlight streaming through windows at certain times of day, may cause glare or shadows that effectively occlude participants' faces. Additionally, in more casual meeting settings or breakout areas, furniture arrangements like high-backed chairs or partitions can create partial occlusions that vary as participants shift their positions.

Figure 4:
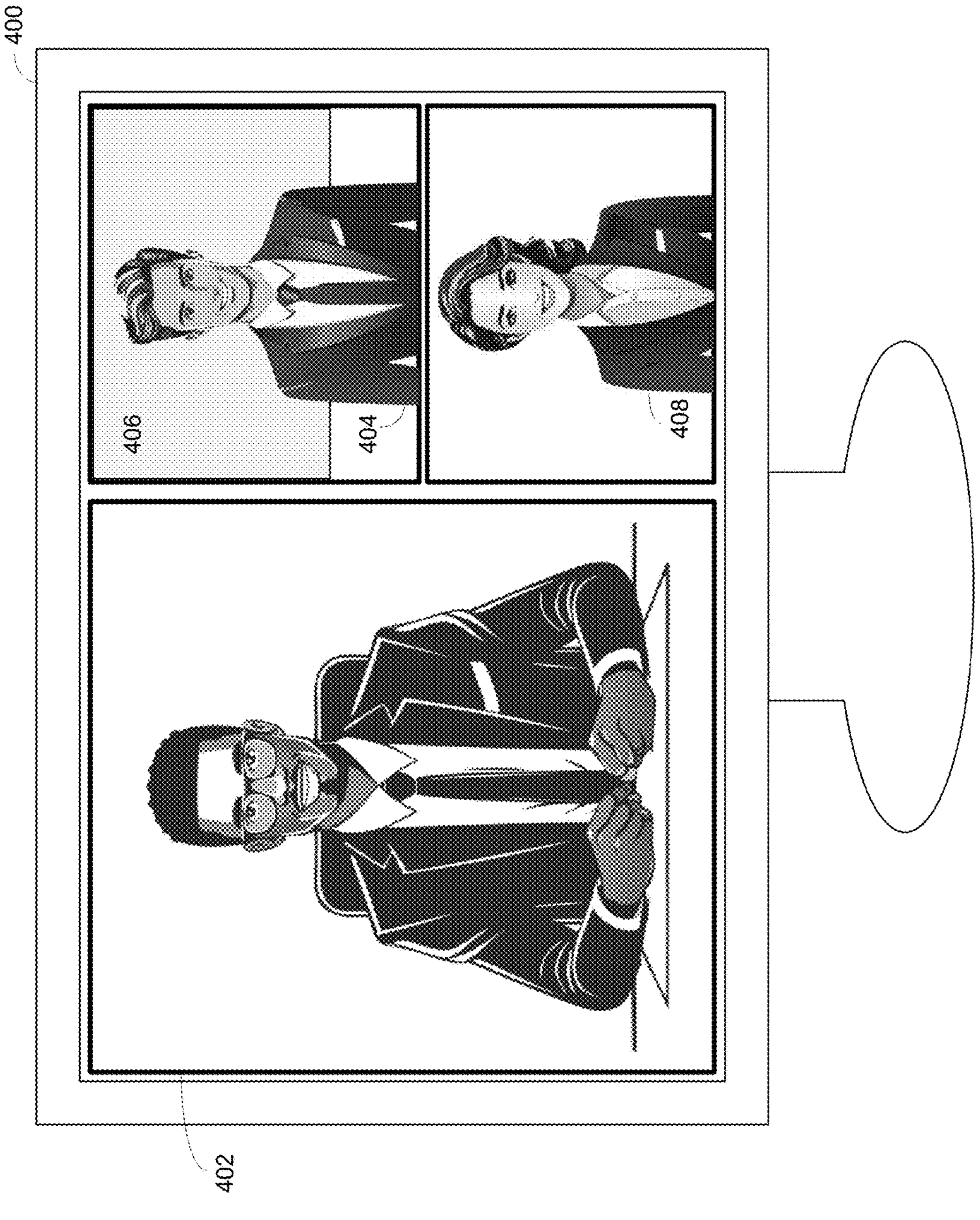
FIG. 4 shows an improved user interface for a network-based meeting, demonstrating the replacement of low-quality video feeds with animated avatars, consistent with some embodiments.

FIG. 4 illustrates an improved user interface 400 for a network-based meeting, demonstrating the improved meeting system's approach to enhancing video representation when certain participants' video feeds do not meet quality thresholds. This figure showcases how the system dynamically replaces low-quality video feeds with photorealistic animated avatars to maintain visual engagement and communication effectiveness.

The meeting user interface 400 displays three participant feeds: 402, 406, and 408. Feed 402 represents a high-quality video feed that meets the system's quality thresholds, while feeds 406 and 408 have been replaced with photorealistic animated avatars due to their original video feeds failing to meet quality standards.

The system works by first capturing a live video stream of the meeting participants and applying a segmentation model to generate individual video feeds for each participant. For example, as shown in FIG. 1, a single video feed captured by the camera 100 is processed by the segmentation model to generate from the single video feed, multiple individual video feeds, each capturing an individual meeting participant, such as meeting participants 104, 106 and 108.

Each individual feed is then analyzed in real-time by a video quality evaluation module or component, which assesses multiple quality metrics:

Head pose: The system evaluates whether the participant's head angle exceeds a predetermined threshold from the frontal view, which may be 95 degrees.

Facial feature occlusion: The system detects if portions of the participant's facial features are obscured or missing in the video feed.

Image quality: The resolution and clarity of the participant's image are analyzed to ensure they meet predetermined levels.

When a video feed fails to meet these quality thresholds, the system generates an animated avatar using a pre-enrolled frontal image of the meeting participant. This pre-enrolled image is captured during a one-time enrollment procedure and stored in the system's user profile data.

Referring again to FIG. 4, for example, if participant 406's video feed shows the participant at an extreme side angle, exceeding the 95-degree threshold, the system would replace their live feed with the animated avatar based on their pre-enrolled frontal image.

While an animated avatar is presented, the system continues to monitor the live video feed of that participant for multiple purposes. First, a speech analysis module or component analyzes the audio signal to detect speech patterns and context, which are then used to generate appropriate facial expressions and lip movements for the avatar. This process ensures that the avatar's mouth movements are synchronized with the participant's speech, maintaining a natural appearance.

In cases where the live video feed is at a suboptimal angle or partially occluded, the system employs various techniques to extract as much information as possible in order to animate the avatars to show facial expressions. In some embodiments, a first technique utilizes advanced facial landmark detection to extract information from visible facial features. However, this method may be less impactful due to its reduced effectiveness when the participant's face is not clearly visible, which often occurs when the system switches to the avatar view.

A second and more commonly used technique relies solely on speech signal analysis to generate facial expressions for the avatar. This method allows for animating the avatar's face, particularly in scenarios where facial landmarks are not sufficiently visible or detectable. The system analyzes various aspects of the participant's speech, including tone, flow, and overall vocal activity, to infer appropriate facial expressions and lip movements.

The speech-based animation technique involves several steps. Initially, the system processes the audio input in real-time, extracting key features such as pitch, volume, and speech rate. These acoustic properties are then mapped to a set of predefined facial expressions and mouth shapes corresponding to different phonemes and emotional states. For example, a rising pitch might trigger a slight eyebrow raise, while increased volume could result in more pronounced mouth movements. The system also considers the overall context and flow of speech to ensure that the generated expressions appear natural and coherent over time.

By prioritizing the speech-based animation technique, the system ensures robust and consistent avatar animation even in challenging visual conditions. This approach allows for seamless representation of participants regardless of their position relative to the camera or any visual obstructions, maintaining engaging and expressive avatars throughout the meeting. The speech analysis module 524 works in tandem with the facial expression generator 522 to analyze the participant's speech patterns and context, using this information to generate appropriate facial expressions and lip movements for the avatar. This ensures that the avatar maintains a natural and engaging appearance even when replacing a low-quality video feed.

The system also analyzes the background of the original video feed to create a simulated background for the avatar. This is achieved by processing the video feed to remove the participant, creating a stable background image, and then placing the animated avatar onto this background. This approach ensures that the avatar's surroundings closely match the actual environment of the participant, maintaining visual consistency.

Importantly, the system continuously monitors the quality of the original video feed. If the quality improves and meets the predetermined thresholds, the system can seamlessly switch back to displaying the live video feed, replacing the animated avatar. This dynamic switching ensures that the most appropriate and highest quality representation of each participant is always presented in the meeting interface.

Consistent with some embodiments, the improved meeting system is designed to maintain visual representation for all participants, even when they temporarily move out of the camera's field of view. This functionality is particularly useful for dynamic meeting scenarios, such as when a participant moves to the front of the room to give a presentation. Referring to FIG. 1, consider meeting participant 102, who is standing out of the field of view of the camera 100.

When a participant like 102 is initially detected in the video stream but subsequently moves out of the camera's view, the system employs several strategies to ensure their continued representation in the meeting interface. First, the system leverages its face recognition and tracking capabilities to maintain awareness of the participant's identity and last known position. This information is stored and associated with the participant's pre-enrolled frontal image in the user profile data.

As participant 102 moves to the front of the room to present, outside the camera's field of view, the system automatically switches to using a hyper-realistic avatar to represent them. This avatar is generated using the pre-enrolled frontal image of the participant, which was captured during the one-time enrollment procedure and stored in the system's user profile data.

The avatar generation process for out-of-view participants follows similar principles to those used for participants with low-quality video feeds. The avatar generator 520 creates a photorealistic animated representation of the participant based on their pre-enrolled image. However, in this case, the system relies entirely on audio input and contextual information to animate the avatar, as no video feed is available for analysis.

The speech analysis module 524 becomes important in this scenario. It processes the audio input from participant 102's microphone in real-time, analyzing speech patterns, tone, and context. This information is then used by the facial expression generator 522 to create appropriate facial expressions and lip movements for the avatar. The system maps acoustic properties such as pitch, volume, and speech rate to a set of predefined facial expressions and mouth shapes, ensuring that the avatar's animations correspond to the participant's speech and emotional state.

To maintain visual consistency, the background and subject simulator 532 plays a role. It analyzes the last known video frame containing participant 102 and creates a simulated background that matches the meeting room environment. Additionally, it may adjust the avatar's appearance to reflect the participant's last known attire and accessories, enhancing the sense of continuity for remote attendees.

The system continuously monitors for the participant's potential return to the camera's field of view. If participant 102 moves back into view and their video feed meets the quality thresholds, the system can seamlessly switch from the avatar representation back to the live video feed. This dynamic switching ensures that the most appropriate and highest quality representation of each participant is always presented in the meeting interface, regardless of their physical position in the room.

By implementing this feature, the system ensures that all participants, including those who may temporarily step out of the camera's view like participant 102, remain visually represented and engaged in the meeting. This approach significantly enhances the inclusivity and effectiveness of hybrid meetings, addressing the common challenge of participant visibility in rooms with dynamic interactions or limited camera coverage.

Figure 5:
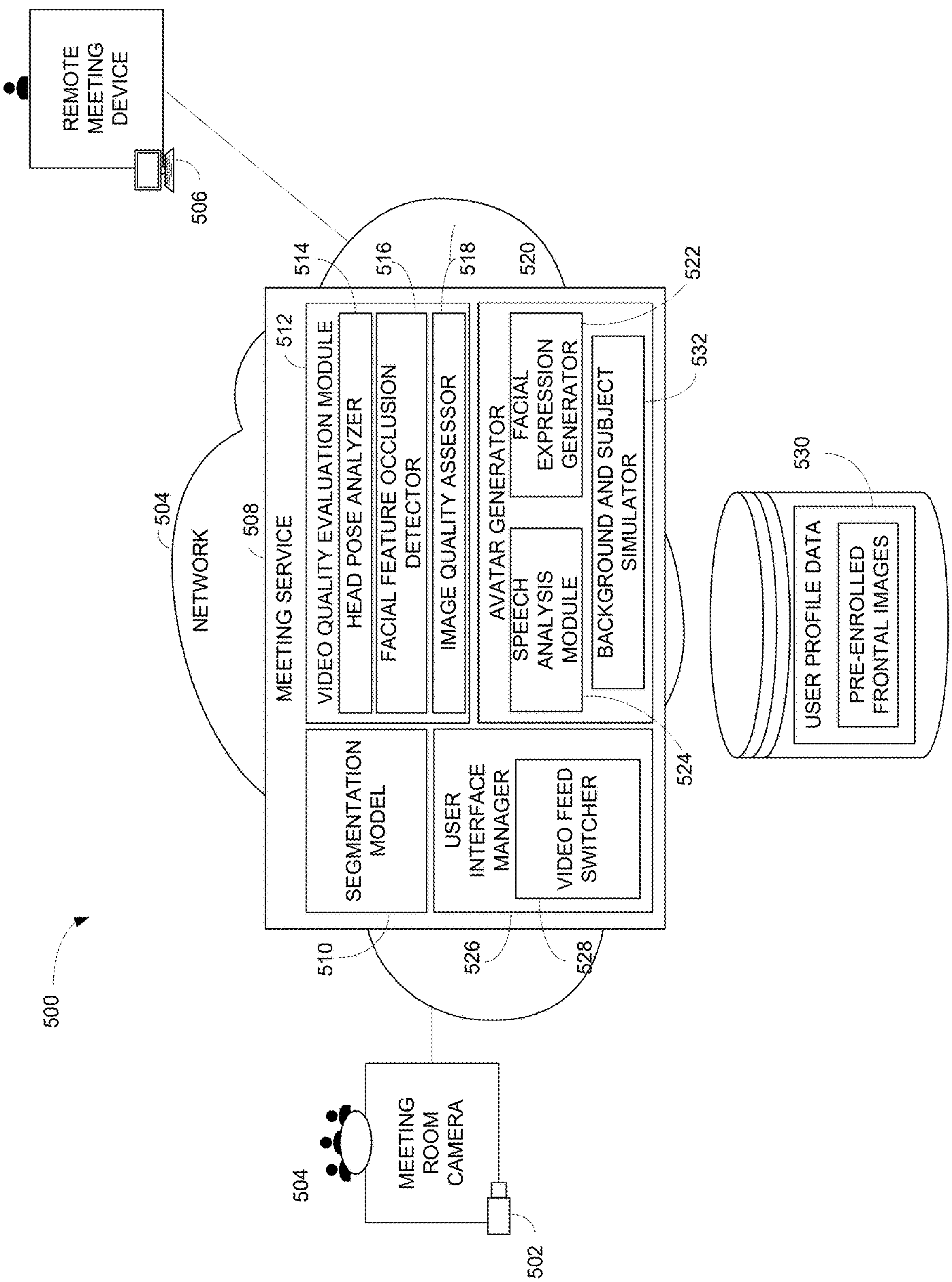
FIG. 5 is a block diagram illustrating a system architecture for enhancing video representation in network-based meetings, consistent with some embodiments.

FIG. 5 illustrates a comprehensive system architecture 500 for enhancing video representation in network-based meetings. This figure depicts the interplay between various components that work in concert to address the challenges of poor video quality and engagement in hybrid meetings.

At the core of the system is the meeting service 508, which orchestrates the entire process. The meeting room camera 502 captures the live video stream of in-room participants, which is then communicated over a network 506 where the video feed is processed by the segmentation model 510. This segmentation model 510 is responsible for identifying and isolating individual meeting participants within the video feed, creating separate streams for each meeting participant.

The video quality evaluation module 512 receives and processes each individual video feed to assess the quality of each individual video feed. The video quality evaluation component 512 comprises three key sub-modules or subcomponents: the head pose analyzer 514, which determines if a participant's head angle exceeds the predetermined threshold from a frontal view; the facial feature occlusion detector 516, which identifies if portions of a participant's face are obscured or missing; and the image quality assessor 518, which evaluates the resolution and clarity of the participant's image.

When the video quality evaluation module 512 determines that a video feed does not meet the quality thresholds, the avatar generator 520 is invoked. This component creates a photorealistic animated avatar of the participant using pre-enrolled frontal images stored in the user profile data and pre-enrolled frontal images database 530. The avatar generation process leverages these pre-enrolled images, which are captured during a one-time enrollment procedure, to create a lifelike representation of the participant.

The speech analysis module 524 works in tandem with the facial expression generator 522 to analyze the participant's speech patterns and context. This information is used to generate appropriate facial expressions and lip movements for the avatar, ensuring that it maintains a natural and engaging appearance even when replacing a low-quality video feed. The system processes the audio input in real-time, extracting key features such as pitch, volume, and speech rate. These acoustic properties are then mapped to a set of predefined facial expressions and mouth shapes corresponding to different phonemes and emotional states.

In addition to these components, the system incorporates a background and subject simulator 532. This module operates to analyze the video feed and create a background that simulates the environment detected in the video. The background simulator processes the individual video feed to remove the participant from the image, creating a stable background image based on the processed video feed. This simulated background is intended to replicate the actual background that appears in the individual video feed of the meeting participant, maintaining visual consistency with the real meeting environment.

Furthermore, the subject simulator component of 532 analyzes various aspects of the meeting participant to simulate or mimic clothing styles, accessories, and other visual characteristics. This analysis includes determining the current attire of the meeting participant, including color patterns of clothing, the current hairstyle of the meeting participant, and any accessories worn by the meeting participant. The avatar is then adapted to reflect these determined attributes, enhancing the sense of presence and continuity for remote attendees.

By incorporating these advanced simulation techniques, the system ensures that the generated avatar not only represents the participant's facial expressions and speech patterns but also maintains a high degree of visual fidelity with the participant's actual appearance and surroundings. This comprehensive approach significantly enhances the realism and engagement of the avatar representation, providing a seamless and immersive experience for all meeting participants, even when faced with challenging video quality issues.

The user interface manager 526 is responsible for presenting the meeting interface to remote participants, while the video feed switcher 528 dynamically manages the transition between live video feeds and animated avatars based on the ongoing quality assessments.

The entire system is connected via a network 504 to remote meeting devices 506, ensuring that all participants, regardless of location, benefit from the enhanced video representation.

This architecture demonstrates one approach to maintaining high-quality visual engagement in network-based meetings. By seamlessly integrating video analysis, avatar generation, and real-time facial expression synthesis, the system addresses the common issues of poor video quality and participant engagement in hybrid meeting environments.

In some embodiments, the system demonstrates enhanced intelligence when dealing with conference rooms equipped with multiple cameras. For instance, with some implementations, the system is capable of simultaneously analyzing multiple live video feeds and dynamically switching between these feeds to select the optimal representation of each meeting participant. This approach maximizes the likelihood of obtaining a high-quality video feed that meets the predetermined quality thresholds.

In such multi-camera setups, the system continuously evaluates the quality of each video feed for every participant using the video quality evaluation module 512. This module assesses factors such as head pose, facial feature visibility, and overall image quality for each available camera angle.

The video feed switcher 528 then selects the best available feed based on these quality assessments. Only when all available video feeds for a particular participant fail to meet the quality threshold would the system resort to replacing the live video with an animated avatar. This ensures that the system exhausts all possibilities of presenting a high-quality live video before implementing the avatar representation.

Conversely, the system maintains constant vigilance over all video feeds. If at any point one of the multiple live video feeds improves to satisfy the quality threshold, the video feed switcher 528 would promptly replace the animated avatar with the newly qualified live feed.

This dynamic switching capability ensures that the system always presents the most engaging and highest quality representation of each participant, seamlessly transitioning between live video and avatar as needed to maintain optimal communication quality throughout the meeting.

In an alternative embodiment to the system architecture illustrated in FIG. 5, some of the processing components may be implemented directly on the meeting room camera device itself, enhancing the system's efficiency and reducing network load. This distributed processing approach allows for more immediate analysis and decision-making at the source of video capture.

For instance, the segmentation model 510 may be integrated into the meeting room camera device 502. This on-device segmentation would enable the camera to identify and isolate individual participants in real-time, creating separate video feeds for each person before transmitting the data over the network.

This approach can significantly reduce the amount of data that needs to be transmitted, as only relevant participant feeds would be sent to the meeting service 508). Similarly, the video quality evaluation module 512 could be implemented directly on the meeting room camera. This would allow for immediate assessment of video quality parameters such as head pose, facial feature occlusion, and image quality.

By performing these evaluations on the camera device, the system can make rapid decisions about whether to transmit a live video feed or signal the need for avatar generation, potentially reducing latency in the overall process.

Furthermore, it is important to note that while the embodiments described primarily focus on evaluating video quality in a multi-participant in-room setting, the same techniques can be applied to remote meeting participants using conventional computing devices with built-in cameras. In these scenarios, the video quality evaluation and potential avatar generation could occur at the meeting service, or on the individual participant's device. This approach ensures consistency in video representation quality across all meeting participants, regardless of their physical location or the type of device they are using.

For remote participants, the device's built-in camera and processing capabilities would handle the tasks of capturing the video feed, evaluating its quality, and potentially generating an avatar if necessary. This distributed processing model allows for a more scalable and flexible system that can adapt to various meeting scenarios, from large conference rooms to individual remote participants joining from personal devices.

Figure 6:
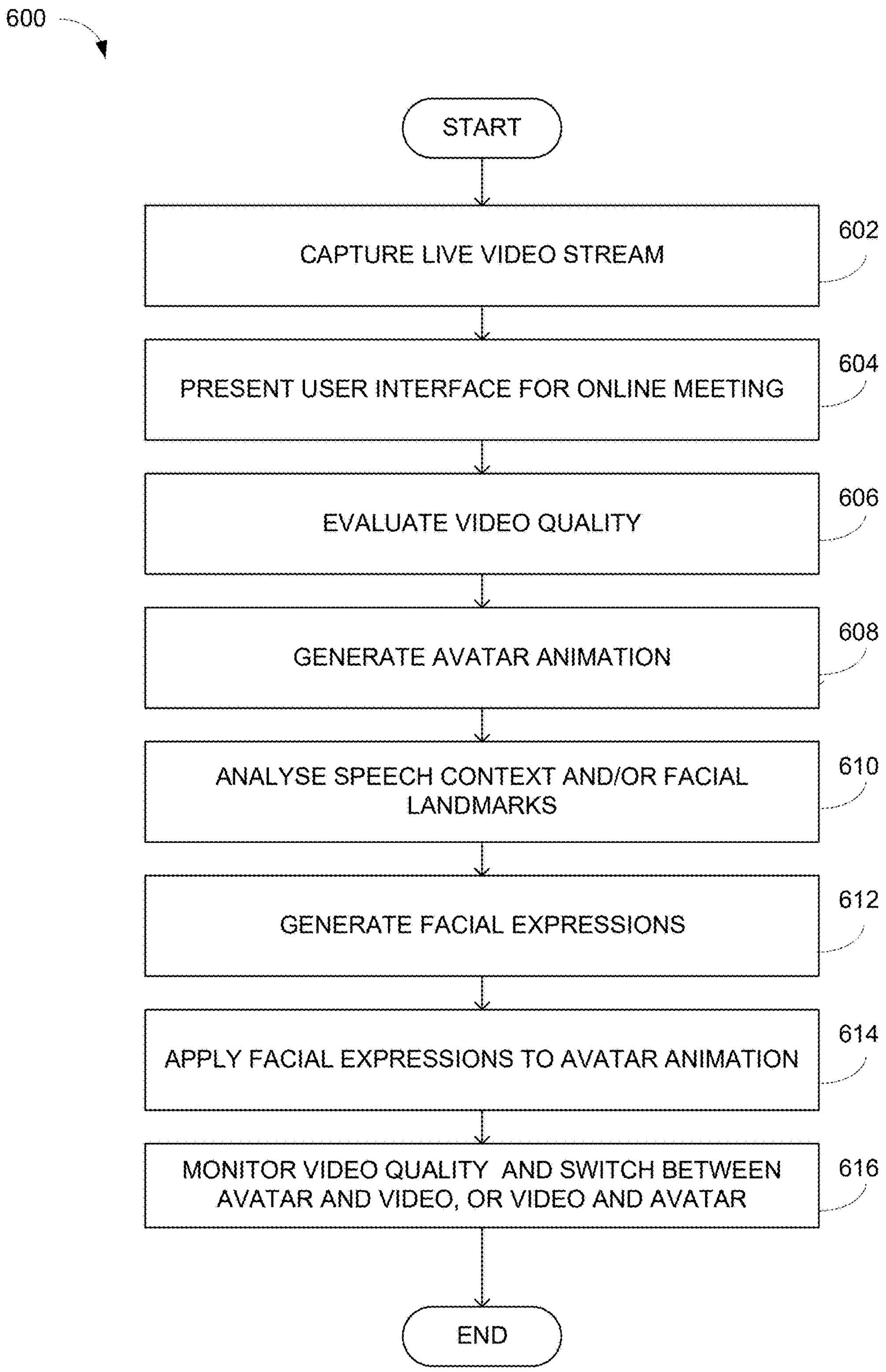
FIG. 6 is a flow diagram illustrating a method for enhancing video representation in network-based meetings, consistent with some embodiments.

FIG. 6 illustrates a flowchart 600 depicting a method for enhancing video representation in network-based meetings. The method comprises several steps, each of which will be elaborated upon in detail.

The process begins with capturing a live video stream 602. This step involves using the meeting room camera 502 to record the ongoing meeting, including all in-room participants. The camera captures a wide-angle view of the room, allowing for the inclusion of multiple participants in a single video feed.

Next, the system presents a user interface for the online meeting 604. This step is handled by the user interface manager 526, which generates and displays the meeting interface on remote participants' devices. The interface typically includes individual video feeds for each participant, arranged in a grid or other suitable layout. Each individual video feed is presented in an individual frame of the user interface.

The next step involves evaluating video quality 606. This step is performed by the video quality evaluation module 512, which assesses each individual video feed against predetermined quality thresholds. The evaluation considers three main factors: head pose, facial feature occlusion, and image quality. The head pose analyzer 514 determines if a participant's head angle exceeds a predetermined threshold from the frontal view, typically around 95 degrees. The facial feature occlusion detector 516 identifies if portions of a participant's facial features are obscured or missing. The image quality assessor 518 analyzes the resolution and clarity of the participant's image.

If the video quality falls below the established thresholds, the system proceeds to generate an avatar animation 608. This step utilizes the avatar generator 520 in conjunction with pre-enrolled frontal images stored in the user profile data. The generator creates a photorealistic animated avatar of the participant, designed to closely resemble their appearance while maintaining a consistent frontal view.

Concurrently, the system performs analysis in operation 610, which may include analyzing speech context, facial landmarks, or a combination of both. The speech analysis module 524 processes the audio input to understand the content and emotional context of the participant's speech. Additionally, when facial landmarks are sufficiently visible, the system may employ advanced facial landmark detection techniques to extract information from visible facial features. This multi-faceted analysis provides crucial input for the next step.

Based on the analysis from operation 610, the system generates facial expressions in operation 612 using the facial expression generator 522. This component interprets the speech context and/or facial landmark data to create appropriate facial expressions and lip movements for the avatar. When relying primarily on speech analysis, the system maps acoustic properties such as pitch, volume, and speech rate to a set of predefined facial expressions and mouth shapes corresponding to different phonemes and emotional states. When facial landmarks are available, the system may use this information to further refine the generated expressions. This approach ensures that the avatar maintains a natural and engaging appearance, regardless of whether the input is derived from speech analysis, facial landmark detection, or a combination of both.

The generated facial expressions are then applied to the avatar animation 614. This step synchronizes the avatar's visual representation with the participant's speech and emotional state, creating a more lifelike and engaging representation.

Finally, the system continuously monitors video quality and switches between avatar and video, or video and avatar 616. The video feed switcher 528 constantly evaluates the quality of the original video feed. If the quality improves and meets the predetermined thresholds, the system seamlessly switches back to displaying the live video feed, replacing the animated avatar. This dynamic switching ensures that the most appropriate and highest quality representation of each participant is always presented in the meeting interface.

This method, as illustrated in FIG. 6, provides a comprehensive approach to maintaining high-quality visual engagement in network-based meetings, addressing common issues of poor video quality and participant engagement in hybrid meeting environments.

Machine and Software Architecture

Figure 7:
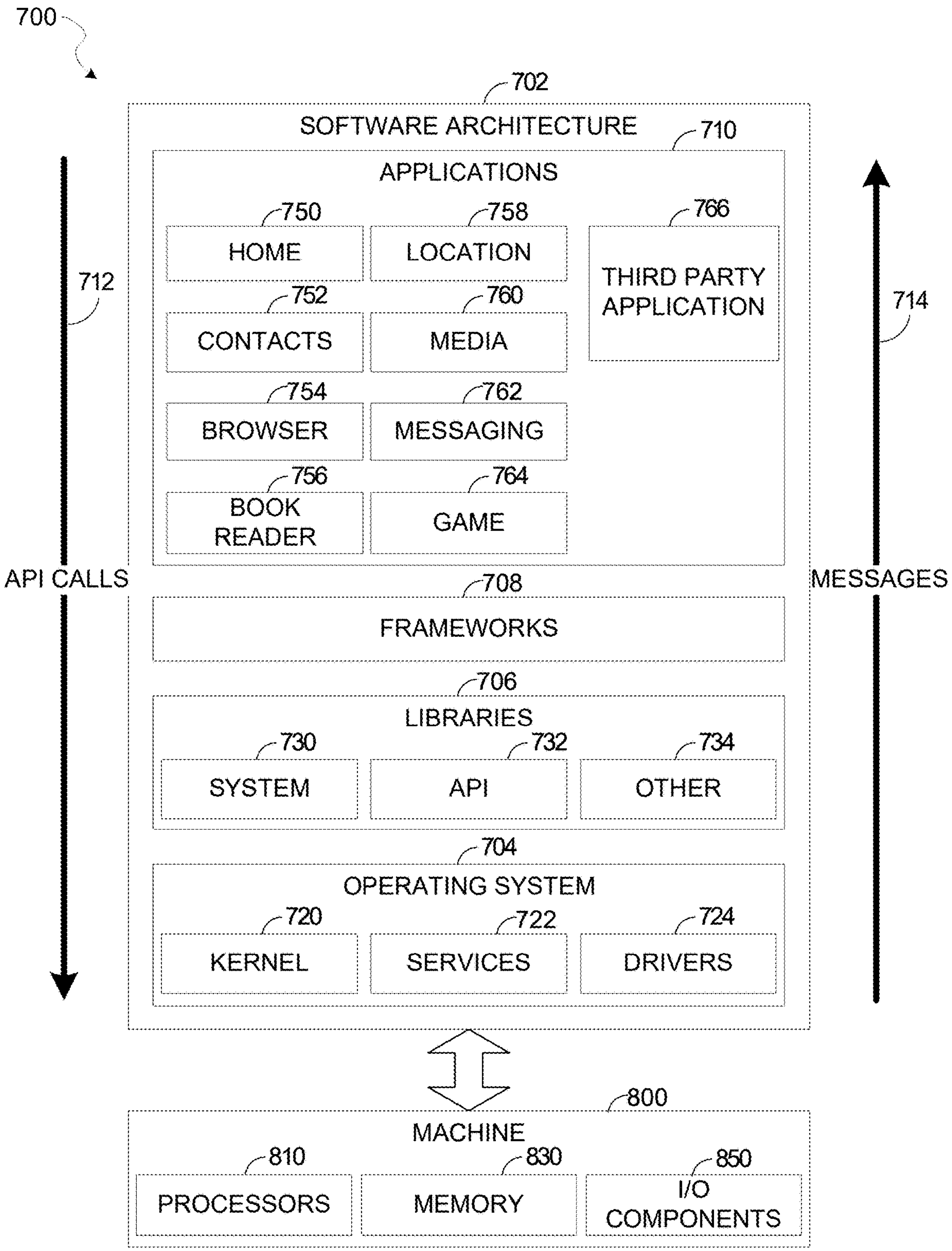
FIG. 7 is a block diagram illustrating a software architecture, which can be installed on any of a variety of computing devices to perform methods consistent with those described herein.

FIG. 7 is a block diagram 700 illustrating a software architecture 702, which can be installed on any of a variety of computing devices to perform methods consistent with those described herein. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various embodiments, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various GUI functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
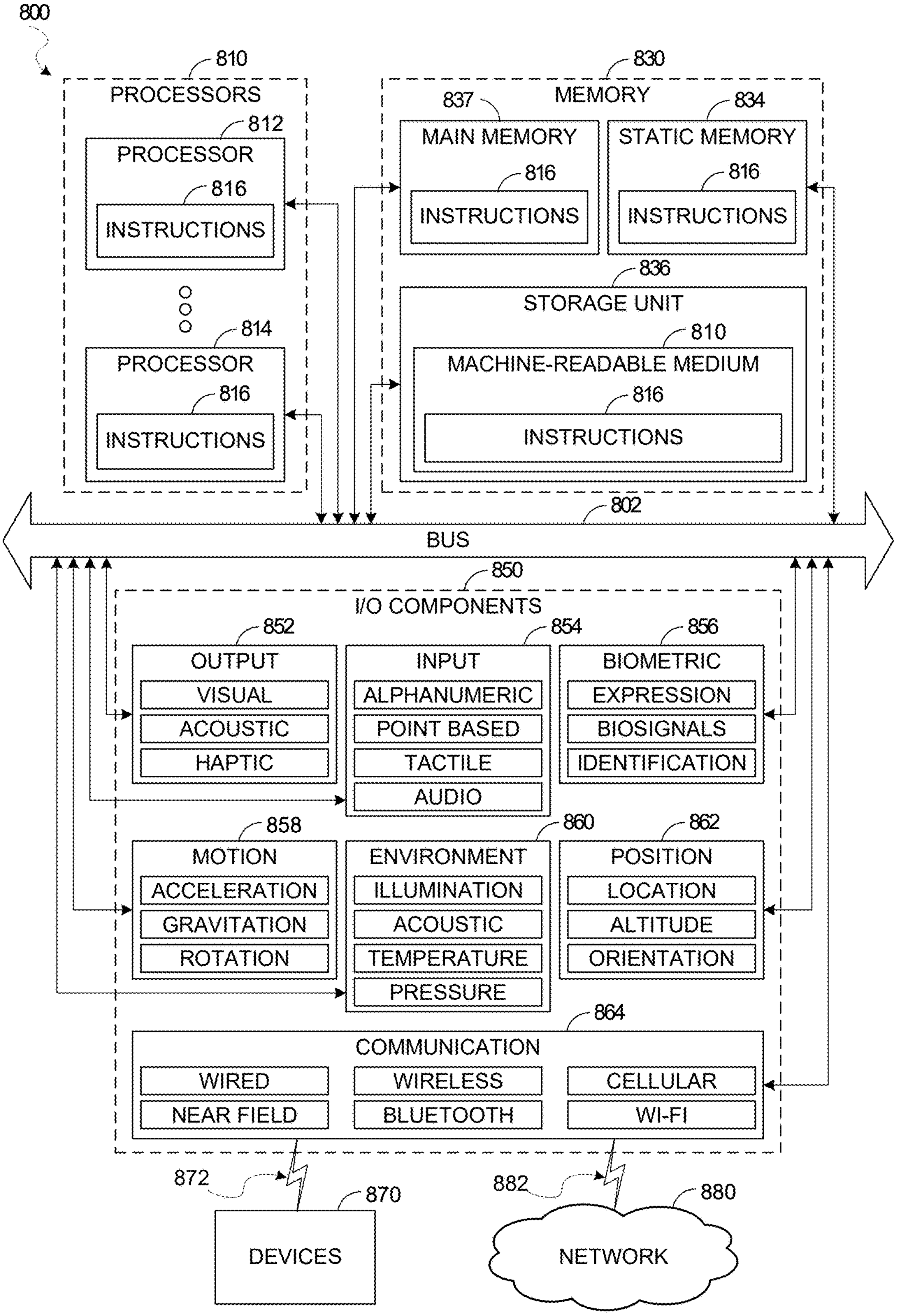
FIG. 8 is a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example the instructions 816 may cause the machine 800 to execute any one of the methods or algorithmic techniques described herein. Additionally, or alternatively, the instructions 816 may implement any one of the systems described herein. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory 830 may include a main memory 832, a static memory 834, and a storage unit 836, all accessible to the processors 810 such as via the bus 802. The main memory 830, the static memory 834, and storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile devices will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 830, 832, 834, and/or memory of the processor(s) 810) and/or storage unit 836 may store one or more sets of instructions and data structures (e.g., software) embodying or utilized by any one or more of the methodologies or functions described herein. These instructions (e.g., the instructions 816), when executed by processor(s) 810, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

We claim:

1. A method for enhancing video representation in a network-based meeting, the method comprising:

capturing a live video stream depicting one or more meeting participants;

presenting a user interface for the network-based meeting to a remote meeting participant, wherein the user interface comprises a plurality of display areas, each display area assigned to display a video feed for a respective meeting participant;

determining that an individual video feed for a meeting participant, presented in a first frame-display area within the user interface, does not satisfy a quality threshold, wherein the quality threshold is not satisfied if:

(i) a head pose of the meeting participant exceeds a predetermined angle from frontal view, wherein the head pose is determined from a position of the meeting participant relative to a camera of the meeting participant;

(ii) a portion of facial features of the meeting participant are occluded in the individual video feed, wherein the facial features are determined to be occluded based on an object that blocks the meeting participant from the frontal view of the camera of the meeting participant; or, (iii) resolution or clarity of an image of the facial features of the meeting participant in the individual video feed falls below a predetermined level;

in response to determining that the individual video feed does not satisfy the quality threshold, generating an animation of the meeting participant based on a previously captured image of the meeting participant;

analyzing speech context or facial landmarks of the meeting participant;

generating facial expression data based on the speech context or the facial landmarks analyzed;

applying facial expressions to the animation based on the facial expression data, and displaying the animation of the meeting participant with the facial expressions applied, automatically in place of the individual video feed, within the first display area of the user interface for the network-based meeting.

2. The method of claim 1, further comprising:

applying a segmentation model to the live video stream to generate an individual video feed for each of the one or more meeting participants, wherein the segmentation model identifies and isolates each meeting participant within the live video stream and each individual video feed comprises a portion of the live video stream depicting a single meeting participant.

3. The method of claim 1, further comprising:

continuously monitoring the individual video feed of the meeting participant, and reverting to displaying the individual video feed within the first display area of the user interface when the individual video feed satisfies the quality threshold;

wherein the first display area of the meeting participant within the user interface remains unchanged for the network-based meeting.

4. The method of claim 1, wherein determining that the individual video feed does not satisfy the quality threshold comprises:

evaluating a head pose of the meeting participant and determining that:

(i) a yaw rotation of the head pose of the meeting participant, representing side-to-side movement, exceeds a first predetermined angle from the frontal view;

(ii) a pitch rotation of the head pose of the meeting participant, representing up-and-down tilt, exceeds a second predetermined angle from the frontal view, (iii) a roll rotation of the head pose of the meeting participant, representing rotation around a central axis of a face of the meeting participant, exceeds a third predetermined angle from the frontal view; or (iv) a combination of yaw, pitch, and roll rotations results in a composite head pose angle that exceeds a fourth predetermined threshold from the frontal view.

5. The method of claim 1, wherein the predetermined angle is in a range of 45 to 105 degrees.

6. The method of claim 1, wherein determining that the individual video feed does not satisfy the quality threshold comprises:

assessing facial visibility of the meeting participant, wherein the quality threshold is not satisfied if a portion of the facial features of the meeting participant are occluded or missing from the video feed.

7. The method of claim 1, wherein determining that the individual video feed does not satisfy the quality threshold comprises:

analyzing image quality factors including the resolution and the clarity of the image of the meeting participant, wherein the quality threshold is not satisfied if the image quality factors fall below predetermined levels.

8. The method of claim 1, wherein generating the animation of the meeting participant based on a previously captured image of the meeting participant comprises:

accessing a pre-enrolled frontal image of the meeting participant captured during a one-time enrollment procedure; and applying animation techniques to the pre-enrolled frontal image to create the animation.

9. The method of claim 1, further comprising:

analyzing the individual video feed of the meeting participant to determine:

(i) a current attire of the meeting participant, including color patterns of clothing;

(ii) a current hairstyle of the meeting participant; or (iii) any accessories worn by the meeting participant; and adapting the animation to reflect the current attire, the current hairstyle, and the accessories.

10. The method of claim 1, further comprising:

generating a simulated background for the animation by:

processing the individual video feed to remove the meeting participant from the image;

creating a stable background image based on the processed video feed; and placing an adapted animation of the meeting participant onto the stable background image;

wherein the simulated background is intended to replicate an actual background that appears in the individual video feed of the meeting participant.

11. A system for enhancing video representation in a network-based meeting, the system comprising:

at least one processor; and at least one memory storage device storing instructions thereon, which, when executed by the at least one processor, cause the system to perform operations comprising:

capturing a live video stream depicting one or more meeting participants;

presenting a user interface for the network-based meeting to a remote meeting participant, wherein the user interface comprises a plurality of display areas, each display area assigned to display a video feed for a respective meeting participant;

determining that an individual video feed for a meeting participant, presented in a first display area within the user interface, does not satisfy a quality threshold, wherein the quality threshold is not satisfied if:

(i) a head pose of the meeting participant exceeds a predetermined angle from frontal view, wherein the head pose is determined from a position of the meeting participant relative to a camera of the meeting participant;

(ii) a portion of facial features of the meeting participant are occluded in the individual video feed, wherein the facial features are determined to be occluded based on an object that blocks the meeting participant from the frontal view of the camera of the meeting participant; or, (iii) resolution or clarity of an image of the facial features of the meeting participant in the individual video feed falls below a predetermined level;

in response to determining that the individual video feed does not satisfy the quality threshold, generating an animation of the meeting participant based on a previously captured image of the meeting participant;

analyzing speech context or facial landmarks of the meeting participant;

generating facial expression data based on the speech context or the facial landmarks analyzed;

applying facial expressions to the animation based on the facial expression data; and displaying the animation of the meeting participant with the facial expressions applied, automatically in place of the individual video feed, within the first display area of the user interface for the network-based meeting.

12. The system of claim 11, wherein the operations further comprise:

applying a segmentation model to the live video stream to generate an individual video feed for each of the one or more meeting participants, wherein the segmentation model identifies and isolates each meeting participant within the live video stream and each individual video feed comprises a portion of the live video stream depicting a single meeting participant.

13. The system of claim 11, wherein the operations further comprise:

continuously monitoring the individual video feed of the meeting participant, and reverting to displaying the individual video feed within the first display area of the user interface when the individual video feed satisfies the quality threshold;

wherein the first display area of the meeting participant within the user interface remains unchanged for the network-based meeting.

14. The system of claim 11, wherein determining that the individual video feed does not satisfy the quality threshold comprises:

evaluating a head pose of the meeting participant and determining that:

(i) a yaw rotation of the head pose of the meeting participant, representing side-to-side movement, exceeds a first predetermined angle from the frontal view;

(ii) a pitch rotation of the head pose of the meeting participant, representing up-and-down tilt, exceeds a second predetermined angle from the frontal view;

(iii) a roll rotation of the head pose of the meeting participant, representing rotation around a central axis of a face of the meeting participant, exceeds a third predetermined angle from the frontal view; or (iv) a combination of yaw, pitch, and roll rotations results in a composite head pose angle that exceeds a fourth predetermined threshold from the frontal view.

15. The system of claim 11, wherein the predetermined angle is in a range of 45 to 105 degrees.

16. The system of claim 11, wherein determining that the individual video feed does not satisfy the quality threshold comprises:

assessing facial visibility of the meeting participant, wherein the quality threshold is not satisfied if a portion of the facial features of the meeting participant are occluded or missing from the video feed.

17. The system of claim 11, wherein determining that the individual video feed does not satisfy the quality threshold comprises:

analyzing image quality factors including the resolution and the clarity of the image of the meeting participant, wherein the quality threshold is not satisfied if the image quality factors fall below predetermined levels.

18. The system of claim 11, wherein generating the animation of the meeting participant based on a previously captured image of the meeting participant comprises:

accessing a pre-enrolled frontal image of the meeting participant captured during a one-time enrollment procedure; and applying animation techniques to the pre-enrolled frontal image to create the animation.

19. The system of claim 11, wherein the operations further comprise:

analyzing the individual video feed of the meeting participant to determine:

(i) a current attire of the meeting participant, including color patterns of clothing;

(ii) a current hairstyle of the meeting participant; or (iii) any accessories worn by the meeting participant, and adapting the animation to reflect the current attire, the current hairstyle, and the accessories.

20. A system for enhancing video representation in a network-based meeting, the system comprising:

means for capturing a live video stream depicting one or more meeting participants;

means for presenting a user interface for the network-based meeting to a remote meeting participant, wherein the user interface comprises a plurality of display areas, each display area assigned to display a video feed for a respective meeting participant, means for determining that an individual video feed for a meeting participant, presented in a first display area within the user interface, does not satisfy a quality threshold, wherein the quality threshold is not satisfied if:

(i) a head pose of the meeting participant exceeds a predetermined angle from frontal view, wherein the head pose is determined from a position of the meeting participant relative to a camera of the meeting participant;

(ii) a portion of the facial features of the meeting participant are occluded in the individual video feed, wherein the facial features are determined to be occluded based on an object that blocks the meeting participant from the frontal view of the camera of the meeting participant; or, (iii) resolution or clarity of an image of the facial features of the meeting participant in the individual video feed falls below a predetermined level;

means for generating an animation of the meeting participant based on a previously captured image of the meeting participant, in response to determining that the individual video feed does not satisfy the quality threshold;

means for analyzing speech context or facial landmarks of the meeting participant;

means for generating facial expression data based on the speech context or the facial landmarks;

means for applying facial expressions to the animation based on the facial expression data; and means for displaying the animation of the meeting participant with the facial expressions applied, automatically in place of the individual video feed, within the first display area of the user interface for the network-based meeting.

* * * * *